United States Patent

Fukuyo et al.

Patent Number: 5,882,114
Date of Patent: Mar. 16, 1999

[54] METHOD OF CONTINUOUS EXTRACTION OF CRUDE WAX AND APPARATUS THEREFOR

[75] Inventors: Kazumi Fukuyo, Minato-ku; Kouji Fujimura, Kisarazu; Toshiharu Fusano, Kawasaki, all of Japan

[73] Assignee: Nippon Petrochemicals Company, Limited, Tokyo, Japan

[21] Appl. No.: 776,198

[22] PCT Filed: Jun. 13, 1996

[86] PCT No.: PCT/JP96/01619

§ 371 Date: Jan. 30, 1997

§ 102(e) Date: Jan. 30, 1997

[87] PCT Pub. No.: WO96/41855

PCT Pub. Date: Dec. 27, 1996

[30] Foreign Application Priority Data

Jun. 13, 1995 [JP] Japan ................................ 7-170347

[51] Int. Cl.$^6$ ................................ B01F 7/04; B01F 7/08
[52] U.S. Cl. ........................ 366/300; 366/317; 366/320
[58] Field of Search ................... 366/297–301, 366/315–317, 318, 320, 321

[56] References Cited

U.S. PATENT DOCUMENTS

| | | | |
|---|---|---|---|
| 1,001,508 | 8/1911 | Craig | 366/320 X |
| 2,382,605 | 8/1945 | Carter, Jr. | 366/316 |
| 2,554,073 | 5/1951 | Swenson . | |
| 3,044,750 | 7/1962 | Schmitt, Jr. | 366/316 X |
| 3,138,167 | 6/1964 | Fisher | 366/320 X |
| 3,244,408 | 4/1966 | Brownlie et al. | 366/300 |
| 4,036,477 | 7/1977 | Sieradzki et al. | 366/300 |
| 4,278,355 | 7/1981 | Forberg | 366/300 |
| 4,281,934 | 8/1981 | Krause et al. | 366/300 X |
| 4,775,239 | 10/1988 | Martinek et al. | 366/300 X |
| 5,152,971 | 10/1992 | Bertrand et al. | 366/320 X |
| 5,228,775 | 7/1993 | Horn et al. | 366/320 X |
| 5,299,865 | 4/1994 | Presnell | 366/320 X |

FOREIGN PATENT DOCUMENTS

| | | | |
|---|---|---|---|
| 60-83799 | 5/1985 | Japan . | |
| 63-315139 | 12/1988 | Japan . | |
| 2-135137 | 5/1990 | Japan | 366/320 |
| 3-118827 | 5/1991 | Japan | 366/320 |
| 4-323297 | 11/1992 | Japan . | |
| 6-122892 | 5/1994 | Japan . | |

OTHER PUBLICATIONS

Japan Powder Industry Society, "Mixing and Mulling Technique", First edition, (Tokyo), Nikkan Kogyo Shimbun Ltd., Aug. 20, 1980, pp. 132–140.

*Primary Examiner*—Charles E. Cooley
*Attorney, Agent, or Firm*—Fisher, Christen & Sabol

[57] ABSTRACT

A method and an apparatus for continuously extracting a wax component contained in a solid residue with a solvent, in which method, the solid residue obtained from the juice of sugar cane is used as a raw material. To make the extraction time uniform and to obtain the wax at a high efficiency of extraction, the solid residue and an organic solvent for extraction are mixed under shear force and agitated in directions perpendicular to the flow direction. The mixing is conducted under an agitated flow condition so as to form a substantially plug flow in the flow direction.

24 Claims, 2 Drawing Sheets

METHOD OF CONTINUOUS EXTRACTION OF CRUDE WAX AND APPARATUS THEREFOR

TECHNICAL FIELD

This invention relates to a method for producing crude wax by means of extraction from sugar canes and the apparatus for use in said method.

BACKGROUND ART

The common method for producing sugar from sugar canes comprises squeezing juice from the stalk of sugar canes by milling and then boiling down the juice to obtain crude sugar.

Along with sugar component, however, the cane juice inevitably contains impurities such as the bark of crushed stalks, vascular bundles and small pieces of stalk pith as well as wax and resin. The wax and resin components are separated from the juice by precipitation followed by filtration, if necessary, with the addition of flocculating agents and filter aids. Other impurities such as the bark of crushed stalks, vascular bundles and small pieces of stalk pith are also eliminated from the juice together with the wax and resin components by the filtration. While crude sugar is produced by boiling down the resulting filtrate, the crude wax are produced from the filter cake (generally known as "cachaza"), which contains wax, resin, bark of crushed stalks, vascular bundles, small pieces of stalk pith in addition to precipitating agents and mud. This filter cake usually contains from 70 to 80 wt % of water, although it is solid in appearance.

In the first pressing, because the sugar cane is crushed or smashed, its filter cake obtained by filtration is a deformable solid substance which is an agglomerate of crushed substances containing water. The crushed pieces or broken pieces forming the agglomerate are in irregular forms or in fiber-like state. As it is an entangled agglomerate containing water, it is a lumpy mass maintaining its own form to some extent. It is not a viscoelastic substance in a true meaning, however, it seemingly exhibits the properties resembling those of a viscoelastic substance.

In Japanese Laid-Open Patent Publication No. 6-122892, there is proposed a method for continuously extracting crude wax using a hydrophobic organic solvent without any previous drying of the filter cake. In this method, the extraction is carried out while kneading the filter cake with the hydrophobic solvent and, as suitable apparatus for use in the method, transferring machines having heating and agitating means which are equipped with mixing elements such as screw, ribbon impellers or paddles, are proposed. Furthermore, it is described to be preferable that the filter cake and solvents are mixed together under shearing stress in order to break down the filter cake, which is partly in lumpy state, into small pieces and to disperse well in the solvents (ibid., page 4, column 5, para. 0017). However, because the substances to be treated are the mixture of the solvent in liquid state and the filter cake in solid agglomerate, the extraction can hardly be carried out by means of the above-mentioned simple transferring apparatus with a mixer such as the single shaft screw extruder as disclosed in the above patent gazette.

In U.S. Pat. No. 2,554,073, another method to produce wax from filter cake is disclosed in which a vertical continuous extracting column is used. In this method, countercurrent extraction of filter cake and solvent is simply carried out by fingers and stirring arms which are turning round on each plate in the column. The water contained in filter cake is considered to exist in the crushed pieces and the spaces among the crushed pieces of the filter cake. When hydrophobic solvent is used, such water obstructs the solvent extraction. The obstruction of this kind cannot be avoided by the simple stirring operation. Meanwhile, if the vigorous stirring is done, the filter cake is dispersed into the solvent in the form of very fine pieces. The finely dispersed filter cake is not desirable because it is inconvenient for the subsequent transferring and other treatment and there is apprehension of the blocking of transfer pipe lines.

It has been found out in the studies carried out by the present inventors that, in the solvent extraction of the wax from the filter cake obtained by processing sugar cane, the wax is a main component of the extract in the early stage of the extraction, however, as the extraction proceeds, the extraction of other components like lignin from the sugar cane fiber tend to increase and the separation of such components from the wax component is very difficult even by utilizing a separation method such as recrystallization operation in a subsequent step. Therefore, it is necessary to control the retention time of the mixture in the extraction equipment in an adequate range in order to obtain crude wax with less lignin content.

From this point of view, a batchwise solvent extraction process has an advantage of offering comparatively narrow distribution of the extraction times. However, it is not suitable for the treatment of large quantities and it is essentially not adequate as an industrial production method.

The conventional methods are not always satisfactory in order to treat a large quantity of material and to avoid the dispersion of retention time in solvent extraction.

In view of the above described circumstances, the object of the present invention is therefore the provision of the extraction apparatus which permits the solvent extraction of crude wax from the solid residue as a raw material separated from the juice obtained by milling sugar cane without substantial dispersion in the extraction times and with high extraction efficiency.

DISCLOSURE OF INVENTION

Figure 1:
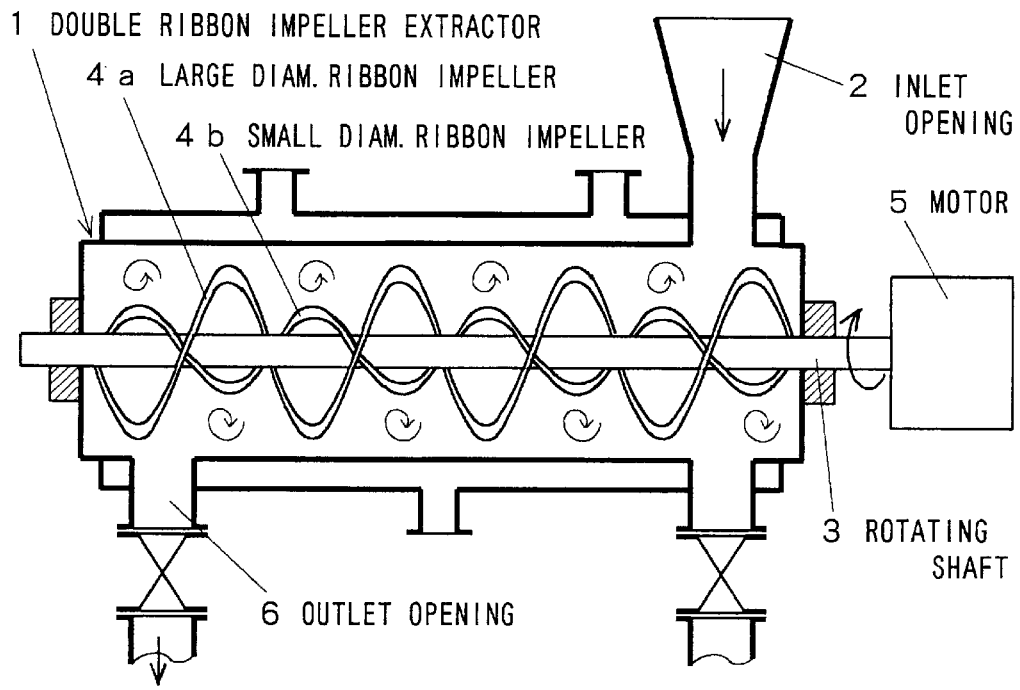
FIG. 1 is a schematic sectional view of an example of the extractor which is provided with double ribbon-type impeller.

The first aspect of this invention relates to a method for the continuous solvent extraction of wax component from the solid residue obtained from sugar canes juice, which method comprises the step of carrying out the extraction under a stirred flow condition with applying shear force to form substantially a plug flow in the axial flow direction together with mixing the solid residue and organic solvents and providing the flow of the mixture with a radial agitation.

The second aspect of the present invention relates to a horizontal-type continuous organic solvent extraction apparatus for the crude wax which is provided with the following component devices of (1), (2) and (3).

(1) An inlet opening for continuously feeding a solid residue obtained from sugar canes juice and an extraction solvent formed on one end portion of a horizontal vessel.

(2) A pair of mixing and transferring devices which are mounted in the above vessel. The mixing function of the device is to mix the mixture of the solid residue and the organic solvent under shear force. The directions of the driving force of the respective devices are opposite, however, the overall transferring function of the devices is such that the mixture is continuously transferred from one end to the other end portion of the vessel.

(3) An outlet opening formed on the other end of the horizontal closed vessel for continuously discharging the solid residue and the extraction solvent.

The third aspect of this invention relates to the continuous organic solvent extraction apparatus for the crude wax in accordance with the second aspect of the invention, which is characterized in that the pair of mixing and transferring devices are rotated on their shafts lying on the transferring direction of the mixture.

The fourth aspect of this invention relates to the continuous organic solvent extraction apparatus for the crude wax in accordance with the third aspect of the invention, which is characterized in the structure of double ribbon-type impellers which generate flows of the mixture in the opposite directions to each other.

The fifth aspect of this invention relates to the continuous organic solvent extraction apparatus for the rude wax in accordance with the fourth aspect of the invention, which is characterized in that said double ribbon-type impellers consist of a ribbon impeller having a larger diameter and a ribbon impeller having a smaller diameter.

The sixth aspect of this invention relates to the continuous organic solvent extraction apparatus for the crude wax in accordance with the third aspect of the invention, which is provided with any of double shaft paddles, double shaft disks and double shaft screws.

The present invention will be described in more detail in the following.

In the method for producing sugar from sugar cane, the juice is, at first, squeezed from the stalk of the sugar cane by passing them through rolls such as sugar mill. The sugar cane is previously crushed sometimes. Resulted cane juice containing sugar, however, is cloudy due to the inclusion of wax or resin components. The wax or resin components are eliminated from the juice by precipitation and subsequent filtration operation using flocculants or filter aids, if necessary. For example, the precipitation of wax and resin components are carried out adding slaked lime by 2–10 wt. % (usually about 5 wt. %). Then the resulted solids precipitate are removed by an adequate apparatus such as a filter press. The filter cake, the residues remained in the filter press after the filtration contains a large quantity of wax and resin components. The wax and other components can be removed by other separation methods such as ultrafiltration and centrifugation besides the filter press.

The term "the solid residue separated from the sugar cane juice" as referred to in the present invention is intended to mean those which are obtained by adding flocculating agents or the like, if necessary, to the sugar cane juice and separating by filtration with a filter press, or ultrafiltration or centrifugation. The filter cake is one of the typical example of the solid residue. As previously described, the solid residue usually contains skin of crushed stalk, vascular, small pieces of stalk pith, flocculants, filter aids, precipitators and mud in addition to the wax and resin components. Furthermore, this solid residue contains 50 to 90 wt. %, preferably 70 to 80 wt. % of water and it is a solid substance in appearance. According to the method of the present invention, it is not necessary to dry the filter cake before the extraction, however, the filter cake dried by any adequate drying method and having reduced water content may also be used as the raw material for the extraction.

In the extraction process according to the present invention, the continuous solvent extraction of the wax components from the solid residue is carried out while mixing and agitating the above-described solid residue and the organic solvent with applying shear force. An organic solvent for the extraction are used in order to dissolve and extract the wax components contained in the solid residue. The hydrophilic organic solvents such as alcohols and ketones extract the water present in the solid residue in large quantities together with wax components, and further, the separation of water from the solvents is not easy in the subsequent operation. Therefore, it is preferable to use hydrophobic organic solvents for the extraction.

Hydrocarbon solvents are the examples of suitable hydrophobic organic solvents. From the view point of environmental pollution and hygienic safety, suitable solvents are exemplified by non-aromatic hydrocarbons of $C_5$ to $C_9$ and preferably saturated liquid hydrocarbons of $C_5$ to $C_9$ such as naphthenic or paraffinic hydrocarbons, and more preferably, isoparaffins of $C_6$ to $C_9$, normal paraffins of $C_5$ to $C_8$ and their mixtures.

In the extraction process, as previously described, wax component is extracted first and then followed by the extraction of lignin component, because the wax component is more soluble than lignin component in common organic solvents. The time gap in dissolution increases when an organic solvent of smaller dissolving power for those two components is used. On the other hand, when an organic solvent of higher dissolving power for those two components is used, there is a possibility that the difference between the time to dissolve wax and the time to dissolve lignin is not so large. When a solvent of high dissolving power is used, the times of extraction for the two components are scarcely different. Therefore, the solvent having higher dissolving power is not useful for the process of the present invention. From this viewpoint, the organic solvents which have relatively low dissolving power for wax and lignin, for example, hydrophobic solvents such as hydrocarbons are advantageous for use in the method of the present invention.

The amount of the organic solvents required for the extraction is 0.05 to 10 times, and preferably 0.5 to 5 times the amount of the solid residue by volume. When the amount of the solvent is less than 0.05 times the amount of the solid residue by volume, the extraction of the crude wax can not proceed satisfactory. On the other hand, when the amount of the solvent exceed 10 times, the efficiency of solvents recovering operation in a subsequent step is low. Therefore, both the cases are not desirable. Regarding the extraction temperature, it is not particularly critical, if it is below the boiling point of the solvents used under the operation pressure. Thus, for example, any temperature in the range of room temperature to 100° C., depending upon the solvent used, can be selected for the extraction process in accordance with the present invention.

In an embodiment of the extraction process in accordance with the present invention, the continuous extraction of wax component from the solid residue is carried out by mixing the solid residue and the hydrophobic organic solvents with stirring under shear force.

The solid residue typically exemplified by the filter cake is a mass of crushed pieces and broken fragments. Water exists in the spaces among these particles, which water obstructs the contact between wax and solvent. For this reason, the solid residue and solvents are kneaded and mixed under shear force without separating the particles of the mass. In addition, even when water exists, the wax and solvent can be brought into intimate contact. If the shear force is not applied or insufficiently applied to the solid residue, for instance only in a simple stirring at insufficient agitation, the satisfactory extraction cannot be attained due to the existing water. Meanwhile, if the speed of stirring is too large, the particles of mass are liable to be separated apart. Accordingly, both the above cases are not preferable.

In order to mix the mixture of solid residue and solvent with applying shear force, an appropriate mixing device which produces agitating function can be used. The mixing device is exemplified by rotating double ribbon impellers, double shaft paddles (a pair of rotating shafts, each having a plurality of paddles), double shaft disks (a pair of shafts, each having a plurality of disks) and double shaft screws. In the case of screws or ribbons, a single shaft device is not desirable because the shear force is not sufficient.

It is necessary for these mixing devices that they have the function to transfer continuously the mixture of solid residue and solvent as well as the function of mixing. By using the above-mentioned mixing device, it is possible to give transferring drive continuously to the above mixture so as to carry out the continuous extraction. The mixing device having the transferring function will be hereinafter referred to as "mixing-transferring device".

The above mixing-transferring device is installed in a proper vessel or container. The vessel is preferably of hermetic structure in order to prevent the solvent from evaporation. The mixture of solid residue and solvent is continuously transferred from one end of a vessel to the other end almost horizontally by the above-mentioned transferring function and the extracting operation is simultaneously done.

As previously described, in the extraction of the solid residue obtained from the sugar cane, too long period of the extraction operation causes the extraction of other unwanted components such as lignin which are not easy to remove by any subsequent refining operation. In the conventional continuous extraction methods, because the dispersion of the extraction time is considerably large, it is inevitable that lignin component is extracted simultaneously to a certain extent together with the wax component, which causes the lowering of the purity of resulting product.

Therefore, in the extraction process according to the present invention, in order to eliminate the substantial dispersion of the extraction time, the continuous solvent extraction of the wax contained in the solid residue is carried out under a stirred flow condition with forming substantially a plug flow in the axial flow direction together with mixing of the solid residue and organic solvent and providing the flow of the mixture with a radial agitation.

It is possible to achieve a continuous extraction of crude wax with none of or very small dispersion of the extraction time by realizing an adequate stirred condition of a plug flow or very close to the plug flow in the flow direction. Formation of a complete plug flow is preferable, however, if the condition of flow is substantially like the plug flow, it is satisfactory to accomplish the purpose of this invention.

It is necessarily to effect a sufficient agitation in a direction perpendicular to the flow direction. By sufficient agitation, intimate contact between the solid residue and organic solvent can be ensured, and the extraction by organic solvent is caused to proceed.

In an embodiment of the present invention, a pair of mixing-transferring devices are employed, in which the transferring direction of one device is opposite to that of the other device. However, it is necessary that the mixture must be transferred to a predetermined one direction, the total transferring function (the sum of mixing-transferring devices) is caused to point one direction. Accordingly, even though the transferring directions of the two devices are opposite, the transferring function (absolute value) of one of them is made a little larger than that of the other. For example, in the mixing devices of double ribbon impellers or double shaft screws, the rotating directions of the pair of ribbons or screws are made opposite or the turning radius of both ribbons are made different. In the mixing devices of double shaft paddles and double shaft disks, it is possible to attain by changing the directions of paddles or disks or by changing the rotating directions of shafts.

The above-mentioned mixing-transferring devices are all rotary type. The movement of the ribbon of double ribbon impeller and the flight of double screws is spiral rotation which has a rotational component on the axis in the direction of transferring. In the cases of double shaft paddles and double shaft disks, they are turned on the axis in the transferring direction. Accordingly, each mixing-transferring device has a maximum linear velocity (circumferential rotational linear velocity) in the peripheral portion of the body of rotation.

Provided that A is the average moving speed (m/min) of a solid residue in the direction of flow (axial direction) and B is the larger circumferential rotational linear velocity (m/min) of a pair of mixing-transferring devices, the value of B/A is preferably 0.5 to 50 and more preferably 1 to 35. When the value is less than 0.5, the transferring speed of the solid residue is too large or the rotational speed is too low or both. This case is not desirable because the contact between the solid residue and the solvent is insufficient. On the other hand, if the value B/A exceeds 50, the transferring speed of the solid residue is too small or the rotational speed is too high or both. This case is not desirable either because the rotating solid residue is pressed toward the inner wall of the vessel by the centrifugal force, and as a result, the contact between the solid residue and the solvent is insufficient, which is not desirable.

For the extraction process in accordance with the present invention, it is possible to use any apparatus which is able to mix sufficiently in the direction perpendicular to the flow direction and to form substantially a plug flow in the flow direction with providing the mixture with sufficient agitating and mixing effect That is, the horizontal continuous organic solvent extracting apparatus for crude wax, which is used in the method of the present invention is a horizontal vessel which is provided with a pair of mixing-transferring devices. The mixing function of the devices is to mix and agitate the mixture of a solid residue and an organic solvent with applying shear force. The direction of the transferring function of one of the devices is opposite to the transferring direction of the other device, however, as the overall transferring function, the pair of devices can transfer the mixture from one end of the vessel to the other end of the vessel.

The one end in the material flow direction of the horizontal extracting apparatus is provided with an inlet opening in order to feed a solid residue and an organic solvent continuously and the other end of the apparatus is provided with an outlet opening to discharge continuously after the extraction operation.

More particularly, there are exemplified by a double ribbon-type impeller extruding apparatus having a larger diameter ribbon and a smaller diameter ribbon which are spirals oriented in the opposite directions, or a double shaft paddle type mixing apparatus having a pair of oppositely rotating shaft fitted with a plurality of paddles, or the apparatus which is made by substituting a group of disks for the group of paddles in the above double shaft paddle type mixing apparatus.

FIG. 1 is a schematic cross sectional view of an embodiment of double ribbon-type extractor. The solid residue and organic solvents such as an aliphatic hydrocarbon is fed continuously into the inlet opening 2 of the double ribbon-type extractor 1. The ribbon having a larger diameter 4a and the ribbon having a smaller diameter 4b attached to the rotating shaft 3 form spirals oriented in the opposite direction to each other. The spiral diameter formed by the ribbon having a larger diameter is larger than that of the spiral formed by the ribbon having a smaller diameter. As the rotating shaft 3 rotates by being driven by a motor 5, the solid residue and the solvent fed in the extractor undergo mixing and agitating action with receiving shear force and travel along the shaft, and in the meantime, the continuous solvent extraction is carried out. After then, the liquid extract in which crude wax is dissolved can be obtained by eliminating the solid residue from the extracted mixture discharged from an outlet opening 6 using adequate separation means (not shown), for example, such as a sieve, filter press or centrifuge. The crude wax is obtained by removing the solvent from the liquid extract by means of evaporation or the like.

In the equipment as shown in FIG. 1, the spiral of the ribbon 4a having a larger diameter is oriented in such a manner as to generate a driving force to direct the flow of the mixture along the axial direction (flow direction) by its rotation and yields the forward flow movement. On the other hand, the spiral of the ribbon having a smaller diameter 4b generate an opposite driving force to direct the fluid flow of the mixture along the axial direction and yields the backward flow movement, since its orientation of the spiral is opposite to that of the ribbon having a larger diameter. Thus, the flow caused by the ribbon having a larger diameter partially offsets the fluid flow caused by the ribbon having a smaller diameter. If the two flows completely cancel each other, there will be no flow movement toward the outlet. However, if the driving force generated by the ribbon having a larger diameter is arranged to be larger than that generated by the ribbon having a smaller diameter, the mixture, as a whole, is able to flow toward the outlet. The magnitude of the driving forces generated by the two sets of ribbons can be independently controlled by adjusting appropriately the shape of the ribbon or the pitch of the spiral.

As described above, a flow toward the outlet as a whole with a substantial plug flow pattern can be formed. The ribbon having a larger diameter usually generates larger driving force than the ribbon having a smaller diameter, because the spiral diameter of the ribbon having a larger diameter is larger than that of the ribbon having a smaller diameter. When the pitches of spirals of both the ribbons are nearly identical, the ratio of the spiral diameter of the ribbon having a smaller diameter to the spiral diameter of the ribbon having a larger diameter is in the range of 0.1 to 0.9, and preferably 0.3 to 0.7, on the basis that the spiral diameter of the ribbon having a larger diameter is 1. When this ratio is less than 0.1, the action of the ribbon having a smaller diameter to offset the flow caused by the ribbon having a larger diameter decreases and thereby unfavorable broad velocity distribution of the flow in the flow direction takes place and consequently the formation of plug flow condition becomes difficult. Meanwhile, if this ratio is more than 0.9, the ribbon having a smaller diameter generates too large reverse driving force and thereby the movement of the mixture toward outlet becomes difficult.

Meanwhile, in the above process, sufficient radial mixing and agitation can be ensured by the rotation of the two ribbon-type impellers.

The set of two ribbon type-impellers are allowed either to rotate in the same direction or to rotate in the opposite direction to each other. In the embodiment as shown in FIG. 1, the two ribbon-type impellers rotate in the same direction with the spirals having the opposite orientation and if the two ribbon-type impellers rotate in the opposite direction to each other, both spirals should be oriented in the same direction.

Despite whether the impellers rotate in the same direction or in the opposite direction, the rotation speed of both impellers can be set independently. If the orientation of the spiral of both ribbon-type impellers are opposite and they are rotated in the same direction with same rotational speed, the production cost of the extractor may be lowered due to its simple mechanical structure.

The rotational frequency is selected from the range of 1 to 500 r.p.m.

Figure 2:
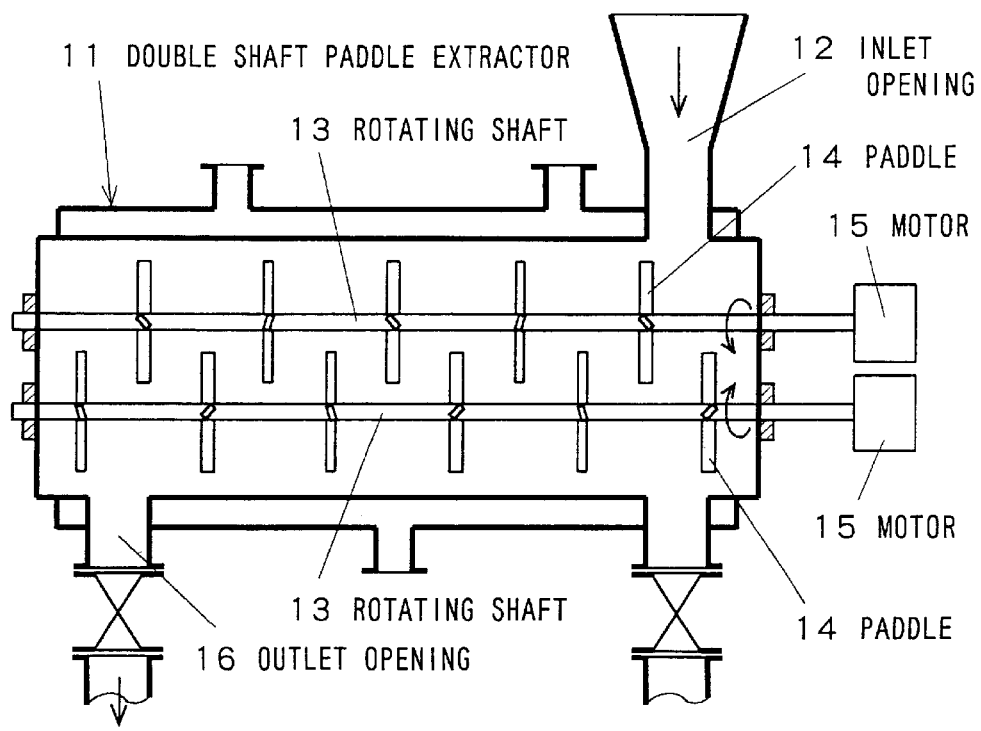
FIG. 2 is a schematic sectional view of an example of the extractor which is provided with a pair of shafts each fitted with a plurality of paddles.

FIG. 2 shows a schematic sectional view of the double shaft paddle-type extractor. The double shaft paddle-type extractor 11 comprises an inlet opening 12, two rotating shafts 13, a plurality of paddles 14 mounted on both the shafts, a motor 15 which drives the rotating shafts and an outlet opening 16.

In FIG. 2, the rotating shafts are driven by two motors, respectively. It is possible to drive them by installing one motor with an appropriate transmission device.

The paddles are attached alternately on the two shafts 13 as shown in the drawing. These two shafts preferably rotate in the opposite direction to each other although they can rotate in the same direction. The rotational frequency is selected from the range of 1 to 500 r.p.m. The number of the paddles is plural and it is generally 2 to 20 for each shaft. The size of the paddles and their pitches are not particularly limited in the present invention.

The configuration of the paddle may be adequately modified so as to transfer the mixture of the solid residue and solvent toward the outlet. For example, the driving force to transfer the mixture can be generated by providing every other paddle on the same shaft with opposite inclination as illustrated in FIG. 2. If the inclination of the paddles which generate driving force to forward the mixture to the outlet is made larger than that of the paddles which generate driving force to transfer the mixture backward to the inlet, the mixture can be transferred toward the outlet as a whole. The same effect can be obtained by making the length of the forward driving paddles larger than that of the backward paddles despite that both inclinations are even identical.

In the double shaft paddle-type extractor shown in the FIG. 2, disks can be used in place of the paddles.

In the disk-type extractor, the solid residue and solvents fed into the extractor are thoroughly mixed and agitated in the direction perpendicular to the rotating shaft with receiving shear force by the friction generated between the disk and the mixture as the disks rotate. In addition the disks offer the so-called wall effect to the material flow due to its flat plate structure, thereby facilitating to create substantial plug flow pattern as a whole. As a result, it is possible to achieve a continuous solvent extraction with the reduced velocity distribution of the flow, e.g. with the narrow dispersion in the time lengths of extraction.

When simple disks are used as a disk-type device, the axial flow of the mixture can be assured by the effect of the gravity which is provided by inclining the whole equipment by an adequate angle, for instance, in the angular range of 1° to 30°.

Figure 3A:
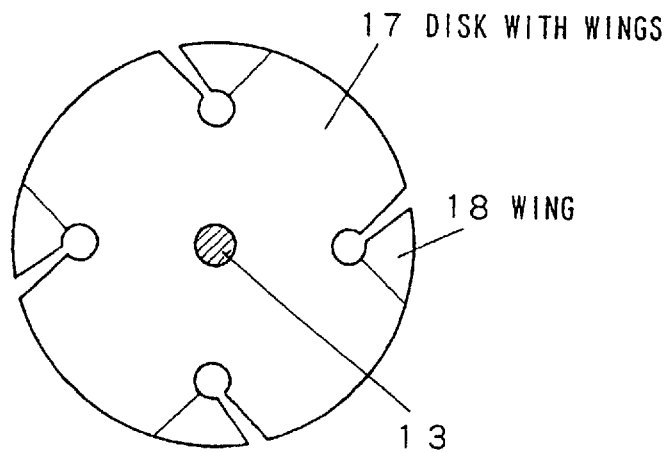
FIGS. 3A and 3B show a front view, respectively and a side view of a disk having wings.
Figure 3B:
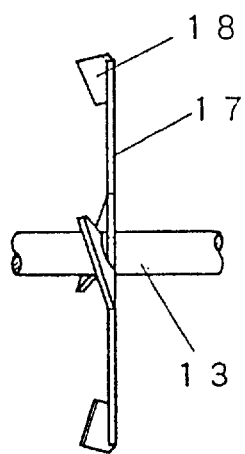

Further, the axial driving force may also be provided by incorporating the disks with wings or wing-like elements. FIGS. 3A and 3B show front and side views, respectively, of an embodiment of the wing-type disk 17 of the present invention. The wing-type disk comprises a disk fitted with a plurality of wings 18.

Even when the double shaft paddle-type extracting equipment in FIG. 2 is used, the liquid extract containing dissolved crude wax can be obtained by eliminating solid residue from the mixture which is withdrawn through the outlet opening 16 of the equipment in FIG. 2 using a sieve or any other suitable separation means. The crude wax is then prepared by removing the solvent by evaporation.

When either extracting apparatus as shown in FIGS. 1 or 2 is used, the extracting time is selected so as to extract a lower amount of lignin component and usually selected from the range of 1 to 180 minutes, and preferably 5 to 60 minutes. When an extracting apparatus as shown in FIGS. 1 or 2 is used, the extracting time can be expressed as the average retention time (the time required to pass through the apparatus).

The extraction may be carried out under atmospheric pressure. However, an optional pressure can be applied by introducing an inert gas or with the vapor pressure generated by the solvent itself. It is possible to reduce the extracting time length with the application of pressure. The magnitude of the pressure, although it depends on the mechanical strength of the used apparatus, is usually under 5 kg/cm$^2$.

BEST MODE FOR CARRYING OUT THE INVENTION

This invention will be described in more detail by way of examples.

<EXAMPLES 1 AND 2>

Various amounts of filter cake (20 wt. % in solid content) obtained by filtering sugar cane juice was fed into a double ribbon-type extractor as shown in FIG. 1 and the extraction of wax content was carried out at temperatures as shown in Table 1 using predetermined quantities of an extraction solvent of Isosol 200 (trademark; $C_6$–$C_9$ isoparaffinic hydrocarbon solvent made by Nippon Petrochemicals Co., Ltd.) Heat was supplied from an external heating means.

The specifications of the extracting apparatus as shown in FIG. 1 are as follows.

The diameter of larger ribbon impeller which provides driving force to transfer the material toward outlet opening 17.0 cm The diameter of smaller ribbon impeller which provides driving force to transfer the material toward inlet opening 9.0 cm The distance between the inlet opening and the outlet opening 53.2 cm The rotational frequency (both ribbon impellers rotate in the same direction with the same speed) 50 r.p.m.

As described above, the two ribbon impellers of the extraction apparatus as shown in FIG. 1 were arranged such that they generated driving force to transfer the mixture in the apparatus in the opposite directions to each other and the driving force to transfer the mixture toward the outlet was made larger than the driving force to transfer the mixture toward the inlet. Under these conditions, adequate flow conditions of the mixture with agitation to form substantially or nearly a plug flow pattern was realized. The flow condition like this was confirmed by the formation of a plurality of vortices in the flow through the observation of the inside of the extractor during the mixing and agitating. The results of extraction are shown in the following Table 1.

Examples 1 and 2 were carried out by changing the extraction temperatures. The ratio of B/A of the average transferring speed (m/min) in the flow direction of solid residue to the circumferential rotational linear velocity B (m/min) of the mixing and transferring device, was 2.7.

<EXAMPLE 3>

The same filter cake as that used in Example 1 was fed into the double shaft paddle-type extractor as shown in FIG. 2 and a predetermined amount (as indicated in Table 1) of Isosol 200 as an organic solvent for extraction was used. The extraction of wax content was carried out at a temperature as indicated in Table 1. Heat was supplied from an external heating means. The results are given in Table 1.

<COMPARATIVE EXAMPLE 1>

The solvent extraction of wax from the filter cake using Isosol 200 was carried out in the like manner as in Example 1 except that a single ribbon-type impeller extractor (an extractor as shown in FIG. 1 without the smaller ribbon impeller) was used as an extractor. The operation temperature is indicated in Table 1 and heating was done using an external heating means.

Because the extractor used in this Comparative Example had only a single ribbon-type impeller, it was considered that a sufficient radial agitation was not attained and an adequate stirred flow condition to form substantially a plug flow in the axial direction was not realized. Accordingly it was suspected that the agitation took place also in the axial direction and the dispersion in the distribution of extracting time was enlarged to some extent. The results are given in Table 1.

TABLE 1

|  | Examples | | | |
| --- | --- | --- | --- | --- |
| Items | Exam. 1 | Exam. 2 | Exam. 3 | Comp. Exam. 1 |
| Composition by Weight | | | | |
| Filter Cake[1] (kg) | 10 | 10 | 10 | 10 |
| Isosol 200 (kg) | 8.2 | 8.2 | 8.2 | 8.2 |
| Extraction Conditions | | | | |
| Temperature (°C.) | 28 | 45 | 45 | 46 |
| Time Length (min) | 30 | 30 | 30 | 30 |
| Ratio of Extracted Crude Wax[2] (%) | 65 | 91 | 85 | 30 |

Notes:
[1]The solid content in filter cake was 20 wt. % (the remainder was water)
[2]The crude wax content excluding resinous substances such as lignin which was determined by analyzing separately the solid content in the filter cake.

INDUSTRIAL APPLICABILITY

The effects and industrial applicability of the present invention are as follows.

(1) Because the extraction of the crude wax is carried out with the formation of almost a plug flow in the flow direction as a whole, the dispersion in the distribution of extraction times is small and difficultly separated impurities such as lignin hardly mix into the crude wax.

(2) The solid residue with a large water content which is separated from sugar cane juice can be fed to the extraction as it stands.

(3) The extractor in accordance with the present invention provides high extracting efficiency due to the improved agitating function.

(4) The extractor in accordance with the present invention enables continuous operation and, as compared with the convention apparatus, it consumes smaller quantity of solvent, the size of apparatus can be made smaller and the extraction capacity is higher.

(5) In the continuous organic solvent extracting apparatus for crude wax which is provided with the double ribbon-type impellers, the two ribbon impellers provide flows in the opposite directions to each other and it is possible to achieve any internal flow condition as desired without difficulty by modifying properly the shapes of ribbons or their spiral pitches.

(6) In the continuous organic solvent extracting apparatus for crude wax having the double shaft paddle-type structure, it is possible to form an almost complete plug flow pattern.

(7) The solid residue containing water as typically exemplified by the filter cake behaves seemingly or partially as a pseudo-viscoelastic substance, so that the physical properties such as viscosity and specific gravity at ordinary temperatures are quite different from those of the extraction solvent in liquid. However, by employing the method and apparatus of the present invention, the solid residue and solvent can be effectively brought into contact with each other to attain the improved continuous extraction even in the above-mentioned extracting conditions.

What is claimed is:

1. A horizontal-type continuous organic solvent extraction apparatus for crude wax comprising:
   a) an inlet opening formed on one end portion of a horizontal closed vessel for continuously feeding a solid residue obtained from sugar cane juice and an organic extraction solvent,
   b) mixing and transferring devices which are mounted on at least one shaft in said vessel, the mixing function of which devices is to mix the mixture of the solid residue and the organic extraction solvent under shear force, the directions of the driving force of the respective devices being opposite to each other, while the overall transferring function of said devices being such that the mixture as a whole is continuously transferred from one end to the other end portion of said vessel in at least substantially plug flow, and
   c) an outlet opening formed on the other end of said vessel for continuously discharging the mixture of said solid residue and said extraction solvent.

2. The horizontal continuous organic solvent extraction apparatus for crude wax as claimed in claim 1 wherein said mixing and transferring devices are rotated on said at least one shaft, said at least one shaft being oriented in the transferring direction of said mixture.

3. The horizontal continuous organic solvent extraction apparatus for crude wax as claimed in claim 2, wherein said mixing and transferring devices are double ribbon-type impellers which transfer driving forces to the mixture in the opposite directions to each other.

4. The horizontal continuous organic solvent extraction apparatus for crude wax as claimed in claim 3, wherein said double ribbon-type impellers consist of a ribbon impeller having a larger diameter and a ribbon impeller having a smaller diameter.

5. The horizontal continuous organic solvent extraction apparatus for crude wax as claimed in claim 2, wherein said mixing and transferring devices are selected from the group consisting of double shaft paddles, double shaft disks and double shaft screws.

6. The horizontal-type continuous organic solvent extraction apparatus for crude wax as claimed in claim 1 wherein said solvent is a hydrophobic organic solvent.

7. The horizontal-type continuous organic solvent extraction apparatus for crude wax as claimed in claim 6, in which said hydrophobic organic solvent is non-aromatic hydrocarbons having 5 to 9 carbon atoms.

8. The horizontal-type continuous organic solvent extraction apparatus for crude wax as claimed in claim 6, in which said hydrophobic organic solvent is selected from the gruop consisting of $C_6$ to $C_9$ isoparaffins and $C_5$ to $C_9$ normal non-aromatic hydrocarbons.

9. The horizontal-type continuous organic solvent extraction apparatus for crude wax as claimed in claim 1, in which the amount of said organic solvent required for the extraction is 0.05 to 10 times the amount of the solid residue by volume.

10. The continuous organic solvent extraction apparatus for crude wax as claimed in claim 1 wherein the ratio of {the larger circumferential rotational linear velocity (m/min.) of a pair of mixing-transferring devices}/{average moving speed (m/min.) of solid residue in the axial direction of flow} is in the range of 0.5 to 50.

11. A continuous organic solvent extraction apparatus for crude wax comprising:
   a) an inlet opening formed on one end portion of a closed vessel for continuously feeding a solid residue obtained from sugar cane juice and an organic extraction solvent,
   b) a pair of mixing and transferring devices which are mounted on at least one shaft in said vessel, the mixing function of which devices is to mix the mixture of the solid residue and the organic extraction solvent under shear force, the directions of the driving force of the respective devices being opposite to each other, while the overall transferring function of said devices being such that the mixture as a whole is continuously transferred from one end to the other end portion of said vessel, and so as to provide the flow of the mixture with a radial agitation in a stirred flow condition to form a substantially plug flow in the axial flow direction, and
   c) an outlet opening formed on the other end of said vessel for continuously discharging the mixture of said solid residue and said organic extraction solvent.

12. The continuous organic solvent extraction apparatus for crude wax as claimed in claim 11 wherein said pair of mixing and transferring devices are mounted on a single rotatable shaft oriented in the transferring direction of said mixture.

13. The continuous organic solvent extraction apparatus for crude wax as claimed in claim 12 wherein said mixing and transferring devices are double ribbon-type impellers which impart transfer driving forces to the mixture in the opposite directions to each other.

14. The continuous organic solvent extraction apparatus for crude wax as claimed in claim 13 wherein said double ribbon-type impellers comprise a ribbon impeller having a larger diameter and a ribbon impeller having a smaller diameter.

15. The continuous organic solvent extraction apparatus for crude wax as claimed in claim 13 wherein the ratio of the spiral diameter of one ribbon-type impeller to the spiral diameter of the other ribbon-type impeller is 0.1 to 0.9:1.

16. The continuous organic solvent extraction apparatus for crude wax as claimed in claim 11 wherein said mixing and transferring devices are selected from the group consisting of double shaft paddles, double shaft disks and double shaft screws.

17. The continuous organic solvent extraction apparatus for crude wax as claimed in claim 11 wherein said mixing and transferring devices are double shaft paddles, a plurality of paddles being mounted on each of two shafts, said paddles being attached alternately on the two shafts.

18. The continuous organic solvent extraction apparatus for crude wax as claimed in claim 17 wherein every other paddle on the same shaft has an opposite inclination.

19. The continuous organic solvent extraction apparatus for crude wax as claimed in claim 18 wherein the inclination of paddles which generate a driving force to forward the mixture to the outlet is greater than the inclination of the paddles which generate a driving force to transfer the mixture backward to the inlet.

20. The continuous organic solvent extraction apparatus for crude wax as claimed in claim 17 wherein the length of paddles which transfer the mixture forward towards the outlet is greater than the length of paddles which drive the mixture backward toward the inlet.

21. The continuous organic solvent extraction apparatus for crude wax as claimed in claim 11 wherein said mixing and transferring devices are double shaft disks, a plurality of disks being mounted on each of two shafts, said disks having a flat plate structure, said apparatus being inclined at an angle of 1° to 30°.

22. The continuous organic solvent extraction apparatus for crude wax as claimed in claim 11 wherein said mixing and transferring devices are double shaft disks, a plurality of disks being mounted on each of two shafts, each of said disks having a plurality of wings.

23. The continuous organic solvent extraction apparatus for crude wax as claimed in claim 11 wherein the ratio of {the larger circumferential rotational linear velocity (m/min.) of a pair of mixing-transferring devices}/{average moving speed (m/min.) of solid residue in the axial direction of flow} is in the range of 0.5 to 50.

24. A continuous organic solvent extraction apparatus for crude wax comprising:
   a) an inlet opening formed on one end portion of a closed vessel for continuously feeding a solid residue obtained from sugar cane juice and an organic extraction solvent,
   b) a pair of mixing and transferring devices comprising a larger diameter ribbon impeller and a small diameter ribbon impeller which are mounted on one shaft in said vessel, the mixing function of which devices is to mix the mixture of the solid residue and the organic extraction solvent under shear force, the directions of the driving force of the respective devices being opposite to each other, while the overall transferring function of said devices being such that the mixture as a whole is continuously transferred from one end to the other end portion of said vessel, and so as to provide the flow of the mixture with a radial agitation in a stirred flow condition to form a substantially plug flow in the axial flow direction, and
   c) an outlet opening formed on the other end of said vessel for continuously discharging the mixture of said solid residue and said organic extraction solvent.

* * * * *